United States Patent [19]

Garcia et al.

[11] 4,407,768
[45] Oct. 4, 1983

[54] FOAMABLE POLYMERIC COMPOSITION COMPRISING PROPYLENE POLYMER AND HYDRATED ALUMINA

[75] Inventors: Rodrigo A. Garcia, Pasadena; Roel Moreno, Houston, both of Tex.; Robert J. Martinovich, Bartlesville, Okla.

[73] Assignee: Phillips Petroleum Company, Bartlesville, Okla.

[21] Appl. No.: 337,925

[22] Filed: Jan. 8, 1982

[51] Int. Cl.$^3$ .............................................. B29H 7/20
[52] U.S. Cl. .................................... 264/54; 264/45.3; 264/53; 264/DIG. 5; 264/DIG. 16; 521/79; 521/907; 521/92; 521/143; 521/144
[58] Field of Search ................... 521/92, 79, 143, 144, 521/907; 264/53, 54, 45.3, DIG. 5, DIG. 16

[56] References Cited

U.S. PATENT DOCUMENTS

| | | | |
|---|---|---|---|
| 2,911,382 | 11/1959 | Barkhuff, Jr. et al. | 521/92 |
| 3,956,212 | 5/1976 | Sakaguchi et al. | 428/461 |
| 4,029,612 | 6/1977 | Collington | 521/92 |
| 4,312,958 | 1/1982 | DiGuilio et al. | 521/92 |
| 4,323,655 | 4/1982 | DiGuilio et al. | 521/92 |

FOREIGN PATENT DOCUMENTS 903564  8/1962  United Kingdom ................. 521/92

OTHER PUBLICATIONS

"Hackh's Chemical Dictionary", Grant, 4th Ed. Copyright, 1972, p. 32.

*Primary Examiner*—Morton Foelak

[57] ABSTRACT

Compositions comprising propylene polymer, e.g., polypropylene, and hydrated alumina as filler precursor and sole blowing agent, wherein the alumina can be 30 to 60 weight percent of the total composition, are converted into foam having a fine and uniform cellular structure by passage through an unvented extruder at specified temperature profiles and pressures.

15 Claims, No Drawings

FOAMABLE POLYMERIC COMPOSITION COMPRISING PROPYLENE POLYMER AND HYDRATED ALUMINA

BACKGROUND

The present invention relates to a composition which can be foamed or expanded, using as the sole blowing agent a filler precursor of hydrated alumina which loses its water of hydration upon heating, and to articles formed from said composition.

The present invention further relates to an improved method of forming such articles from foamed or expanded polyolefin materials by direct extrusion.

Generally, thermoplastic polymeric materials may be heated to a plastic or molten condition, foamed and expanded, and then extruded into articles of desired shape. The unexpanded polymeric material may be provided, for example, in the form of beads, pellets, or other preformed particles which are coated or otherwise combined with a suitable chemical blowing agent. When such preformed particles are heated, the blowing agent generates a gas as it decomposes and thereby causes the polymeric material to foam and expand as it is converted into a molten condition. This expanded molten material may be then extruded and quenched to provide articles having a desired cellular structure.

With most expandable polymeric materials, the density of the foam, and the resulting extruded article, depends upon the amount of blowing agent which has been employed. Expandable polyolefin materials are an exception, however, since conventional extrusion procedures do not facilitate the formation of articles having a specific gravity of less than about 0.45, regardless of the amount of blowing agent used.

While a complete explanation is lacking, it appears that perhaps molten polyolefin materials cannot contain the expanding gas as rapidly as it is generated. Thus, when attempting to form polyolefin articles of such low specific gravity by direct extrusion, the expanding gas ruptures the surface of the molten material as it is extruded and causes collapse of some of the cellular structure. The polyolefin article which results usually exhibits a rough and porous surface and is of greater specific gravity than desired.

U.S. Pat. No. 4,029,612 discloses the use of silica-promoted chemical blowing agents and aluminum hydroxide (up to 20 weight percent) in thermoplastic polymeric materials comprising polyolefins which can be extruded or injected to form foamed articles. U.S. Pat. No. 3,563,939 discloses the use of particular types of alumina trihydrates as fillers for organic compositions comprising polypropylene and ethylene-propylene copolymer, without a blowing agent, which are used as electrical insulating materials. Although the preferred organic binder system of U.S. Pat. No. 3,563,939 for use with a low-alkaline alumina hydrate filler, comprising a polyepoxide and curing agent, is disclosed in the examples and claimed as such, this reference alleges that such a filler could be used with a wide variety of organic binder materials, comprising thermoplastics which include polyethylene, propylene and ethylene-propylene copolymers.

SUMMARY OF THE INVENTION

A primary object of this invention is to provide a new or improved and more satisfactory method for forming articles of foamed polyolefin materials, particularly polypropylene.

Another object is an improved method for forming articles having a low specific gravity from foamed or expanded polyolefin materials.

Still another object is to provide an improved method of forming articles with a density of less than 0.4 grams/cm$^3$ from foamed or expanded polyolefin materials by direct extrusion.

A further object is to provide such articles or materials of foamed or expanded polyolefin materials which are flexible and pliable, thus suitable for a variety of purposes comprising the packaging of fragile items.

These and other objects are accomplished in the present invention by a method in which beads, pellets or other preformed particles of polyolefin materials, containing or admixed with hydrated alumina as a sole blowing agent and filler precursor, are rendered molten and expanded prior to being extruded into articles of desired shape.

These and other objects and features of the invention will become apparent from the following detailed description and the appended claims.

Although it is known that efforts to extrude lightweight, foamed polyolefin materials by using chemical blowing agents are generally unsuccessful, we have discovered that by filling homopolymers or copolymers of propylene with such hydrated alumina, then passing the composition through an unvented extruder at specific temperature profiles and pressures, a lightweight foamed material with a fine, uniform cellular structure and density less than about 0.2 g/c.c. is obtained.

By thus heating the molten composition to a temperature or temperatures above the dehydration temperature of the hydrated alumina (but below the decomposition temperature of the polymeric material), the chemically bound water of hydration is liberated, acting as a blowing agent. The dehydrated alumina remains as a filler in the resulting foamed composition. As will be discussed more fully in the examples, to achieve the desired uniform cellular structure, it is presently preferred to begin with either a dry-blended premix or a melt-mixed sample produced at temperatures below the dehydration temperature of the hydrated alumina. This composition is then foamed in an unvented extruder using a high feed zone temperature (about 260° C.) grading down to a relatively low die temperature (about 145° C.).

DESCRIPTION OF THE PREFERRED EMBODIMENTS

The present invention provides thermoplastic compositions comprising homo and random copolymers of propylene and hydrated alumina, which functions as both a sole blowing agent and a filler precursor.

These thermoplastic compositions can also contain one or more additives such as other polymeric materials, dyes, pigments, stabilizers, dispersants, solvents, extenders, and the like. Suitable polymers employable in the compositions of the invention are propylene polymers containing from about 98 to 100 weight percent polymerized propylene units. Such polymers are normally solid, resinous homopolymers and copolymers of propylene, generally copolymerized in a random fashion with one or more comonomers selected from aliphatic mono-1-olefins containing from 2 to about 10 carbon atoms, preferably ethylene. In such propylene-ethylene copolymers, the polymerized propylene comprises from 98 to 99.9 weight percent of the copolymer. The density of the polymers is in the range of about 0.90 to about 0.91 g/cc having melt flows in g/10 minutes ranging from about 0.5 to about 50 as determined in accordance with ASTM D1238-65T, Condition L.

Polypropylene having a melt flow ranging from about 2 to 12 and a density of about 0.90–0.91 g/cc is presently preferred. Surprisingly, when hydrated alumina is added as a blowing agent and filler precursor to polyethylene, polypropylene with polyethylene blended therein, or propylene-ethylene copolymers containing more than about 3 percent ethylene units copolymerized therein, attempts to produce a foamed material in accordance with this invention are unsuccessful. The resultant cell structure is nonuniform and the texture of the materials is unsatisfactory for the desired applications.

Hydrated alumina used in this invention is defined by the chemical formula $Al_2O_3 \cdot xH_2O$, wherein x has any value from 1 to 3. Alumina trihydrate, $Al_2O_3 \cdot 3H_2O$, is presently preferred. Commercially available grades of hydrated alumina normally used as fillers for organic compositions contain various impurities and varying amounts of water of hydration, as indicated by the chemical formula above. Such hydrated alumina is generally obtained as an intermediate in the commercial manufacture of alumina, and is made from bauxite by a series of steps which includes treatment with alkali. The hydrated alumina is precipitated in the form of smooth, rounded particles, which may be used as is for fillers or the practice of this invention. When alumina hydrates are used as fillers, improved physical properties of molded compositions result when such precipitated hydrated alumina particles are further processed, as by crushing to thereby form rough, irregularly-shaped particles of more or less uniform mass. It is known that rough particles have markedly better reinforcing characteristics than do smooth particles. Thus, while the generally-available commercial grades of hydrated alumina are operable to serve as filler precursors and blowing agents in accordance with this invention, particular features or properties of the alumina can be emphasized to improve the resulting properties of the compositions for particular applications, all within the context of this invention. For example, U.S. Pat. No. 3,563,939 discloses that alkaline impurities in the alumina can have an adverse effect when used as a filler for various organic binders; thus, for certain applications, aluminas with low impurity levels are particularly preferred. The hydrated aluminas presently preferred are finely divided materials in which about 90% will pass a screen of 100 mesh.

The hydrated alumina suitable for this invention can be used in widely varied proportions, dependent upon factors comprising the amount of filler and blowing agent effect desired, the type of base polymer employed and the degree of hydration of the alumina. Generally, the preferred content will range from about 30 to about 60 weight percent of the hydrated alumina based on the total weight of the filled composition. Presently preferred is a range of from about 35 to about 45 weight percent. The incorporation of the hydrated alumina filler into the composition can generally be accomplished by simple blending.

In a further embodiment, the present invention provides a process for preparing an article of a foamed plastic material which comprises heating a thermoplastic polymeric composition comprising a polymeric material selected from polypropylene and propylene copolymers, in the presence of finely divided hydrated alumina, to a temperature which is below the decomposition temperature of the polymeric material and above the dehydration temperature of the hydrated alumina, to cause at least part of the water of hydration to be liberated. The heating process is preferably carried out in a non-vented extruder of a particular temperature profile, generally decreasing from a maximum where the composition enters to a minimum where the foamed composition is extruded. The resulting foamed plastic material has a fine and uniform cellular structure; an outer surface or layer which is a tough, elastic, flexible, semiporous skinlike material suitable for retaining marks made by writing instruments comprising pencils, pens and markers; a pliable, compressible consistency; and a density in the range of about 0.1 to about 0.2 grams/cm$^3$.

The thermoplastic composition may contain any of the additives set out above.

Preferably the article is produced by extrusion or injection molding. In these applications, the advantages of the blowing agent composition are particularly apparent. However, the process is not limited to these applications and is also suitable for the following and other applications.

The thermoplastic composition may be formed into a sheet by extruding. If desired, the sheet may be formed onto a backing member such as a resinous material, impregnated felt, coating paper or the like. The sheet may optionally be overcoated with a protective plastic layer.

As discussed previously, and disclosed more fully in the examples, the presently preferred method of practicing this invention is to prepare a premix and/or Banbury mixer composition below the dehydration temperature of the hydrated alumina used, then foam the composition by passing it through an unvented extruder using a particular temperature profile. It is presently preferred to use a high feed zone temperature (about 260° C.), grading down to a low die temperature (about 145° C.), which has the effect of creating a back pressure of about 900–2500 pounds per square inch gauge (psig) and initiates the reaction which liberates the water which serves as the blowing agent. By feeding the compositions of this invention through an extruder with a preferred temperature profile, a very white foam of polypropylene, for example, exhibiting very fine and uniform cellular structure, can be produced continuously.

The following examples will further illustrate our invention. All parts and percentages are by weight.

EXAMPLE I

A series of compositions was prepared by blending the specified polypropylene with the specified quantity of alumina trihydrate and the designated quantities of other agent or agents, if used. Generally, the polyproylene in powder form (fluff), as received from the reactor, was mixed with the alumina trihydrate powder, and the other components, when used, in a Henschel mixer at room temperatur for several minutes, or in a Banbury mixer at about 165° C. for the specified time.

Each polypropylene is a commercially available, normally solid crystalline material having a melt flow in the range of 2 to 35 g/10 minutes as determined in accordance with ASTM D 1238, Condition L, a density in the range of 0.902–0.908 g/cc as determined in accordance with ASTM D 1505, and a flexural modulus in the range of 225,000 to 250,000 psi (1550 to 1725 MPa) as determined in accordance with ASTM D 790.

Alumina trihydrate, a commercially available material, was employed as received.

Each composition was passed through a 2½-inch (63.5 mm) diameter extruder equipped with a rod die about ⅜ inch (9.5 mm) in diameter. The extruder barrel was heated in 4 zones with electrical heaters, each thermostatically controlled as known in the art. Generally, the extruded material was taken off after appropriate cooling (water bath or air jets) in rod form. In one instance, the relatively warm extrudate from the die was cut into irregularly-shaped pieces about ½ to about 1½ inches (12 to 25 mm) in length which were cooled as above.

Generally, the temperature profile of the extruder barrel from rear zone 1 to front zone 4 was zone 1 and 2, 260° C.; zone 3, 246° C. and zone 4, 210° C. The extruder gate was maintained at about 150°–160° C. and the die temperature was maintained at about 150° C. The temperature and pressure of the melt entering the die were recorded by means of conventional sensors.

The composition of each sample and several extrusion conditions are given in Table I.

TABLE I

| | Polypropylene - Alumina Trihydrate Blends | | | | | | | |
|---|---|---|---|---|---|---|---|---|
| | Run No. | | | | | | | |
| Composition, Parts by Weight | 1 | 2 | 3 | 4 | 5 | 6 | 7 | 8 |
| Polypropylene | 59.7 | 49.7 | 59.2 | 59.7 | 49.7 | 60 | 59.8 | 59.7 |
| Melt Flow | 2 | 2 | 5 | 5 | 5 | 12 | 12 | 35 |
| Alumina trihydrate | 40 | 50 | 40 | 40 | 50 | 40 | 40 | 40 |
| Stabilizers | 0.3$^a$ | 0.3$^a$ | 0.3$^a$ | 0.3$^a$ | 0.3$^a$ | 0 | 0.2$^b$ | 0.3$^a$ |
| Organic Peroxy Compound | 0 | 0 | 0.5$^c$ | 0 | 0 | 0 | 0 | 0 |
| Die Temp. °C. | 143 | 143 | 146 | 141 | 143 | 146 | 149 | 143 |
| Melt Temp. °C. | 177 | 177 | 188 | 182 | 176 | 179 | 169 | 149+ |
| Melt Pressure, psig | 1250+ | 1000 | 1250+ | 1900 | 1900 | 1250 | 1000+ | 1250+ |
| Screw Speed, RPM | 20 | 11 | 11 | 30 | 20 | 10 | 10 | 11 |
| Banbury mix time @ 165° C./min. | 0 | 0 | 12 | 0 | 0 | 3.5 | 12 | 18 |
| Remarks: | white, good structure | white, good structure | yellowish color, good structure | white, good structure | white, good structure | made pellets with hot die face cutter | white, good structure | very white, good structure |

Notes:
In run 8, the melt temperature sensor malfunctioned at about 150° C. Based on other runs, the estimated melt temperature was about 177° C.
In runs 1, 3, 7, 8 the melt pressure sensor malfunctioned. Based on other runs at similar screw speeds, the estimated melt pressure in runs 1 and 3 was about 1500–2000 psig, in run 7 about 1250 psig and in run 8 about 1500 psig.
$^a$Stabilizer system comprised 29 weight percent calcium stearate, 52 weight percent tetrakis [methylene(3,5-di-t-butyl-4-hydroxyhydrocinnamate)] methane and 19 weight percent 2,6-di-t-butyl-4-methylphenol.
$^b$Stabilizer system comprised 47 weight percent calcium stearate, 23 weight percent second component in a and 30 weight percent third component in a.
$^c$2,5-dimethyl-2,5-bis(t-butylperoxy)hexane The results show that foamed polypropylene of a fine and uniform cellular structure and density of about 0.2 g/c.c. can be extruded from various polypropylene-alumina compositions premixed at room temperature in a high speed mixer (Henschel) or in a high intensity mixer (Banbury mixer) at about 165° C. Polypropylene having melt flows ranging from 2 to 35 can be employed, with the lower melt flow material, e.g. about 2 to 12, presently preferred to obtain better control of the foam structure. Stabilized or unstabilized polypropylene can be used, although stabilized resin is preferred to extend the useful life of the product.

EXAMPLE II

A series of compositions was prepared consisting from about 30 to about 60 weight percent alumina trihydrate and from about 70 to about 40 weight percent of a normally solid polyethylene having a density ranging from about 0.92 to 0.96 g/cc. Each composition was passed through the extruder as before, employing similar extrusion conditions. In no instance was a foam produced having a desirable cellular structure. Thus, polyethylenes of typical densities were unsuitable for producing the foamed compositions of this invention.

EXAMPLE III

Several compositions were prepared from 12 melt flow polypropylene (used in Example 1), polyethylene having a density of 0.919 g/cc and a melt index of 10 g/10 minutes as determined in accordance with ASTM D 1238, Condition E and alumina trihydrate. In one composition, polypropylene was 55 weight percent, polyethylene was 5 weight percent and the balance, 40 weight percent, was alumina trihydrate. In the second composition, polypropylene was 45 weight percent, polyethylene was 15 weight percent and alumina trihydrate was 40 weight percent.

Each composition was extruded under conditions similar to those employed in Example I, run 7. The product produced in each of these runs had unsatisfactory cellular structure. Thus, compositions containing about 5 to 15 weight percent of polyethylene were no improvement over the compositions of Example II

We claim:

1. A foamable thermoplastic composition comprising a propylene polymer selected from the group of resinous homopolymers of propylene and copolymers of propylene copolymerized with a minor amount of one or more comonomers selected from the group consisting of aliphatic mono-1-olefins containing from 2 to about 10 carbon atoms, said composition having dispersed therein a filler precursor and sole blowing agent being particulate hydrated alumina of the formula Al$_2$O$_3$.xH$_2$O, wherein x has any value from 1 to 3.

2. A composition in accordance with claim 1 wherein said homopolymer has a melt flow in the range of from about 0.5 to 50 and a density of about 0.9 to 0.91 grams per cm$^3$.

3. A composition in accordance with claim 1 wherein said copolymer comprises from 98 to 99.9 weight percent polymerized propylene units.

4. A composition in accordance with claim 1 wherein said aliphatic mono-1-olefin is ethylene.

5. A composition in accordance with claim 4 wherein said copolymer is a random copolymer of propylene and ethylene.

6. A composition in accordance with claim 1 wherein said copolymer is a random copolymer of propylene and a comonomer.

7. A composition in accordance with claim 1 wherein said filler precursor and blowing agent is from about 30 to about 60 weight percent of said composition.

8. A composition in accordance with claim 1 wherein said filler precursor and blowing agent is from about 35 to 45 weight percent of said composition.

9. A process for preparing a foamed plastic material which comprises heating a foamable composition in accordance with one of the claims 1 to 8 to a temperature above the melting temperature, but below the decomposition temperature, of said propylene polymer and above the dehydration temperature of said hydrated alumina, such that at least part of the water of hydration of said alumina is released to act as a blowing agent, and subsequently cooling the foamed composition.

10. A process in accordance with claim 9 wherein said composition is heated in a nonvented extruder having a temperature profile decreasing from a maximum at the feed zone to a minimum where the foamed composition exits and is extruded therefrom.

11. A process in accordance with claim 10 wherein said extruder has a temperature profile decreasing from about 260° C. to about 145° C., producing a maximum back pressure in said extruder in the range of about 900 to about 2500 psig.

12. A process for extruding or molding an article of foamed plastic material, comprising extruding or molding a composition in accordance with one of claims 1–8 in an extrusion or molding apparatus.

13. A process in accordance with claim 12 wherein said molding apparatus is an injection molding machine.

14. A process in accordance with claim 12 wherein said composition is formed into sheets.

15. A process in accordance with claim 12 wherein said composition is extruded in a shape of a desired cross section.

* * * * *